United States Patent [19]

Mandozzi

[11] Patent Number: 4,496,038
[45] Date of Patent: Jan. 29, 1985

[54] MECHANISM FOR DIRECT TRANSMISSION OF FEED MOVEMENTS TO THE OPERATING UNITS OF AN AUTOMATIC MACHINE WITH REVOLVING TABLE

[75] Inventor: Aldo Mandozzi, Ponte Capriasca, Switzerland

[73] Assignee: Azypatent AG, Vaduz, Liechtenstein

[21] Appl. No.: 394,471

[22] Filed: Jul. 1, 1982

[30] Foreign Application Priority Data

Jul. 9, 1981 [CH] Switzerland .................. 4524/81

[51] Int. Cl.³ ............................... B65G 47/00
[52] U.S. Cl. .................... 198/339; 414/223
[58] Field of Search ............ 198/339, 345, 480, 478, 198/603, 625; 29/785, 792; 414/223

[56] References Cited

U.S. PATENT DOCUMENTS 2,537,660 1/1951 Eldred ..................... 198/480
2,923,138 2/1960 Rollins ..................... 198/603

Primary Examiner—Joseph E. Valenza
Assistant Examiner—Kyle E. Shane
Attorney, Agent, or Firm—Young & Thompson

[57] ABSTRACT

The mechanism makes it possible to control the advance of operating units (9, 9′) in a much simpler fashion than known mechanisms which use cams or long tappets. It comprises the following: a plurality of toothed wheels (3), one for each station (9, 9′), all of them activated by a single toothed belt (1) through one or more motors (4) which can be asynchronous. Each toothed wheel (3) controls the following: one upper shaft (4), one endless screw (6), one companion wheel (7), one roller (5), and one lever (10, 18) for the advance of the upper operating units (9). At the same time it controls the following: a lower shaft (4′), an endless screw (6′), a companion wheel (7′), a roller (5′), a lever (10′, 18′) for the advance of the lower operating unit (9′).

6 Claims, 2 Drawing Figures

MECHANISM FOR DIRECT TRANSMISSION OF FEED MOVEMENTS TO THE OPERATING UNITS OF AN AUTOMATIC MACHINE WITH REVOLVING TABLE

The present invention has for its object a mechanism for the direct transmission of feed movements to the operating units of an automatic machine with a revolving table.

It differs notably from known mechanisms which use a purality of cams located at the base of the machine and placed on two parallel shafts or on four shafts arranged in a pattern according to the sides of a square, and—through long tappets—controlling the operating unit.

The present mechanism in fact is simpler, more efficient and flexible than those known now, that is to say, it permits a better adaptation to the various operating requirements.

The present mechanism is characterized by the following:

a plurality of toothed wheels along the periphery of the revolving table, one toothed wheel for each station, that is to say, for each pair of upper and lower operating units; a toothed belt or a toothed chain or the like, engaging with all of said toothed wheels so as to activate them contemporaneously and in synchronism through a coupling of at least one motor;

each toothed wheel at the same time controls: an upper shaft and, through speed reduction members, an upper cam, an upper needle roller and an upper lever, acting upon the upper operating unit of said station;

a lower shaft, coaxial with the upper one and, through speed reduction members, controlling a lower cam, a lower needle roller, and a lower lever, acting upon the lower operating unit of the same station.

For greater clarification, the attached drawings represent a preferred but non-restrictive form of the mechanism according to this invention.

Figure 1:
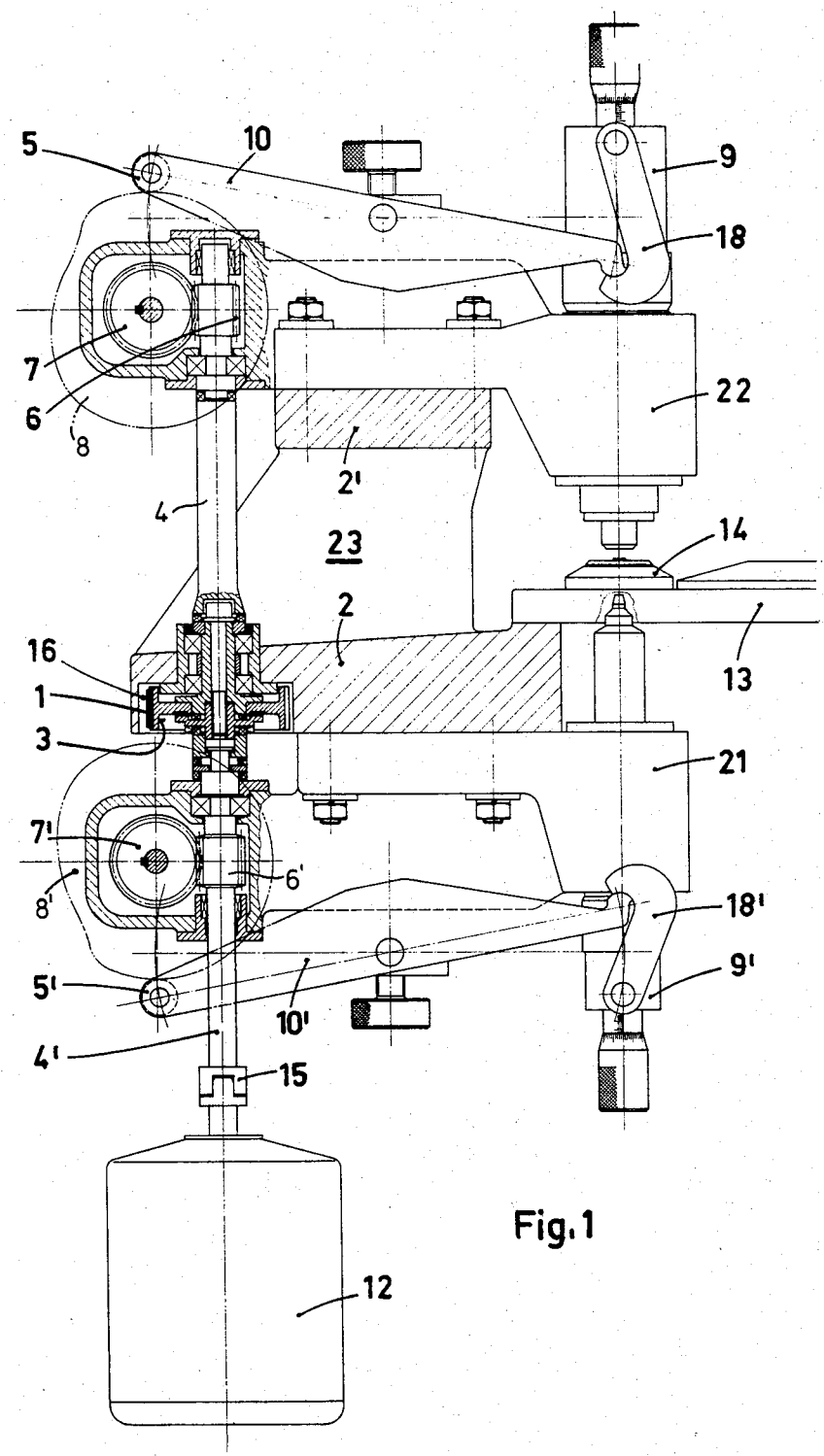
FIG. 1 shows it in an axial cross-section in conjunction with a working station.
Figure 2:
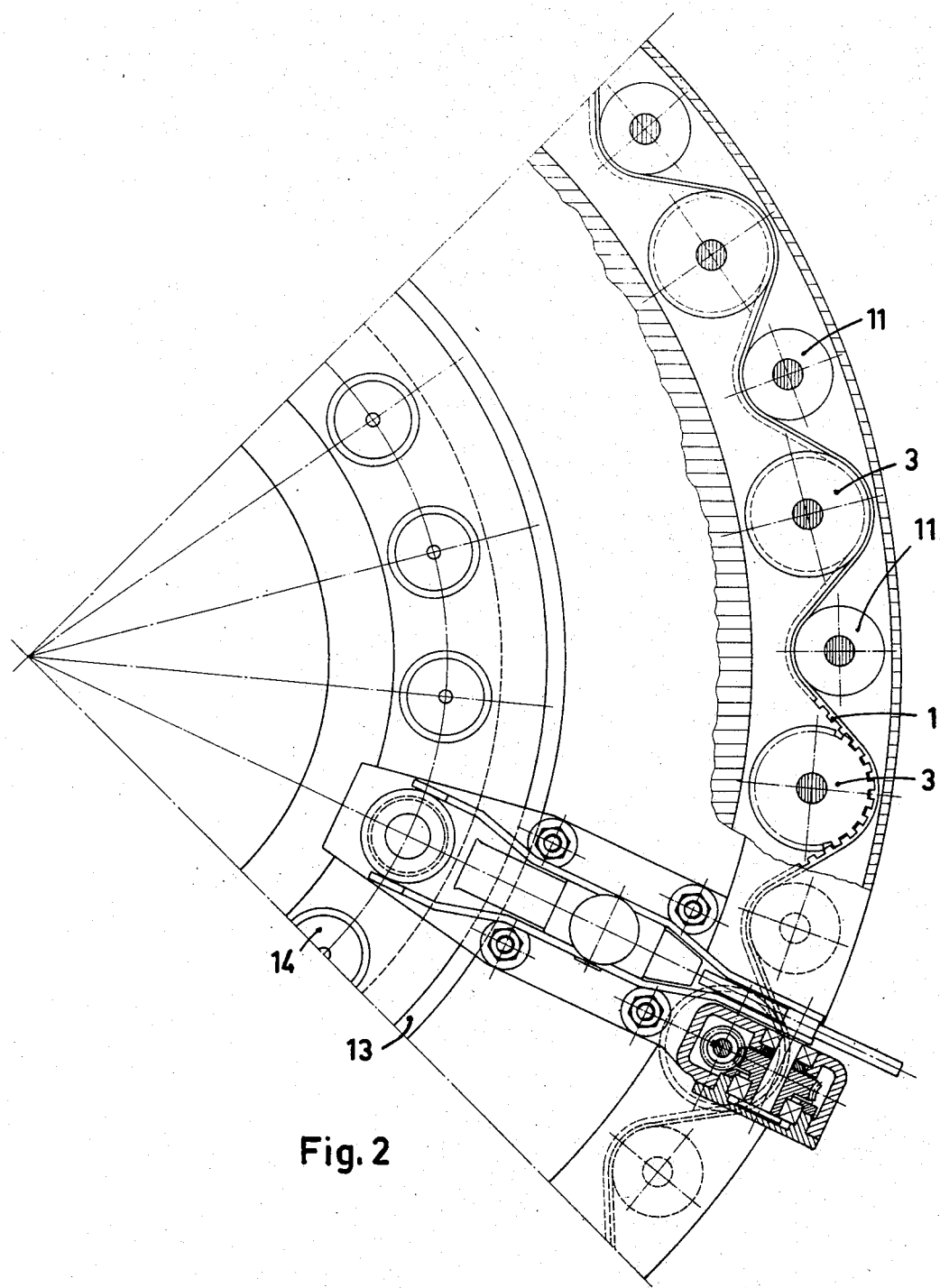
FIG. 2 is a partial view of the horizontal cross-section along the horizontal plane passing through the various toothed wheels.

The mechanism comprises a plurality of toothed wheels 3, arranged along the periphery of revolving table 13, that is to say, within the annular groove 16 on the underside of support 2 of revolving table 13.

For each working station on revolving table 13, that is to say, for each work operation, there is provided a toothed wheel 3 which controls the upper operating unit 9 and the corresponding lower coaxial operating unit 9'.

The various toothed wheels 3 are actuated simultaneously and therefore in synchronism with each other by the toothed belt or the toothed chain 1, through motor 12 and coupling 15.

Each toothed wheel 3 controls the following: the upper shaft 4 and, through speed translation members, for example, the endless screw 6 and the companion wheel 7, the upper cam 8, the upper roller 5, the upper levers 10 and 18, so as to act upon the upper operating unit 9 of that same station.

Toothed wheel 3 simultaneously controls also the lower shaft 4', the endless screw 6', the companion wheel 7', the lower cam 8', the lower needle roller 5', the lower levers 10' and 18' so as to act upon the lower operating unit 9' of the same station.

The two operating units 9 and 9' normally are comprised by two coaxial mandrels, bearing the respective tool, each actuated by its own motor.

The toothed belt or toothed chain 1 extends from the idling sprockets 11, arranged between one toothed wheel and the adjacent one, so as to increase the contact angle of the belt or chain with respect to the toothed wheel to obtain maximum traction.

Provision has been made that—according to the number of operating units 9, 9' and the power required—the toothed belt or chain 1 may be capable of being driven by several motors, always through couplings 15 acting upon the toothed wheels 3.

The motors 12 can also be of the asynchronous type, synchronized with each other by the toothed belt or toothed chain 1.

From motor 12, which drives the belt 1, one can—through a reducer having the same reduction as the endless screws 6, 6' and the companion wheels 7, 7'—also control the rotatable table 13.

It is important to note that the support 2, 2' (FIG. 1) consists of two sturdy rings connected to each other by spokes 23, spaced apart from each other so as to form a single support for the blocks 21 and 22 which carry the operating units 9 and 9'.

Since there are intervals between these spokes, there is easy access to the working positions.

What is claimed is:

1. An automatic machine with a revolving table having a plurality of work stations spaced about the table, upper and lower operating units at each said station for performing working operations on a workpiece, a toothed wheel for each work station, an endless flexible toothed member engaging all the toothed wheels so as to drive them simultaneously and in synchronism, at least one motor to circulate the endless flexible member, an upper shaft and a lower shaft being driven in rotation by each said toothed wheel, upper speed reduction members and an upper cam and an upper roller and an upper lever drivingly interconnecting the upper shaft with the upper operating unit of each work station, and lower speed reduction members and a lower cam and a lower roller and a lower lever drivingly interconnecting the lower shaft with the lower operating unit of each work station.

2. An automatic machine as claimed in claim 1, and idle sprockets arranged between said toothed wheels, said endless toothed member passing on opposite sides of said sprockets and toothed wheels so as to increase the width of the angle about which the endless toothed member engages said toothed wheels.

3. An automatic machine as claimed in claim 1, said toothed wheels being disposed in an annular groove on the underside of the revolving table.

4. An automatic machine as claimed in claim 1, there being a plurality of said motors, said motors being asynchronous and being synchronized with each other by said endless toothed member.

5. An automatic machine as claimed in claim 1, said speed reduction members each comprising a worm driven by a said shaft, said worm driving a pinion which drives said cam.

6. An automatic machine as claimed in claim 1, in which said table is comprised by two vertically spaced rings interconnected by upright spokes spaced apart from each other so as to give easy access to said work stations between said spokes.

* * * * *